(12) United States Patent
Zhang et al.

(10) Patent No.: US 8,158,224 B2
(45) Date of Patent: Apr. 17, 2012

(54) METHOD AND APPARATUS FOR ALTERING DEVICE APPEARANCE

(75) Inventors: Ruth Yu-Ai Zhang, Gilbert, AZ (US); Roger Ady, Chicago, IL (US); Rick Latella, Woodstock, IL (US); Louis J. Lundell, Buffalo Grove, IL (US); Manuel Oliver, Scottsdale, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 1023 days.

(21) Appl. No.: 12/111,665

(22) Filed: Apr. 29, 2008

(65) Prior Publication Data

US 2009/0269524 A1    Oct. 29, 2009

(51) Int. Cl.
*B32B 1/08*    (2006.01)
*G21G 5/00*    (2006.01)
(52) U.S. Cl. .................. 428/34.1; 250/492.1
(58) Field of Classification Search .......... 250/462.1, 250/466.1, 472.1, 492.1; 362/34, 84, 253, 362/362, 800, 806
See application file for complete search history.

(56) References Cited

U.S. PATENT DOCUMENTS

| 4,812,171 | A |   | 3/1989 | Brettle et al. |
|---|---|---|---|---|
| 5,117,116 | A | * | 5/1992 | Bannard et al. ............ 250/474.1 |
| 7,044,614 | B2 |  | 5/2006 | Levy et al. |

* cited by examiner

*Primary Examiner* — Rena Dye
*Assistant Examiner* — Susan R Dye

(57) ABSTRACT

A housing (100, 300, 600, 700) for storing and protecting items comprises a photoreactive material (106) that selectively and irreversibly changes colors upon exposure to activating radiation (124, 324); and an ultraviolet attenuation coating (102, 702) disposed over the photoreactive material (106). Radiation (124, 324) is selectively applied to the photoreactive material (106) to irreversibly change the color of the photoreactive material (106) and therefore the housing (100, 300, 600, 700). An optional patterned layer (332) may be disposed between the photoreactive material (106) and the selective application of radiation (124, 324), and a background color (108) may be included, to affect the visual presentation of the housing (100, 300, 600, 700).

9 Claims, 3 Drawing Sheets

METHOD AND APPARATUS FOR ALTERING DEVICE APPEARANCE

FIELD

The present invention generally relates to the use of photoreactive compound materials, and more particularly to the use of photoreactive compound materials to irreversibly change the appearance of a housing for a variety of devices.

BACKGROUND

The market for electronic devices, especially personal portable electronic devices, for example, cell phones, personal digital assistants (PDA's), digital cameras, and music playback devices (MP3), is very competitive. Manufacturers are constantly improving their product with each model in an attempt to cut costs and to meet production requirements.

The look and feel of personal portable electronics devices is now a key product differentiator and one of the most significant reasons that consumers choose specific models. From a business standpoint, outstanding designs (form and appearance) may increase market share and margin.

Consumers are enamored with appearance features that reflect personal style and select personal portable electronics devices for some of the same reasons that they select clothing styles, clothing colors, and fashion accessories. Consumers desire the ability to change the appearance of their portable electronics devices (cell phones, MP3 players, etc.). Plastic snap-on covers for devices such as cell phones and MP3 players can be purchased in pre-defined patterns and colors. The types of electro-optical modules that one could affix or embed in a portable electronic device to enable a changing appearance are limited by a number of factors. Portable electronic devices must be particularly thin, robust, and low power. Sales of high volume consumer products are very sensitive to consumer preferences for design, functionality, and cost. These factors produce a narrow engineering window requiring unique solutions.

Accordingly, it is desirable to provide a method and apparatus for changing the appearance of a device housing. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

Figure 1:
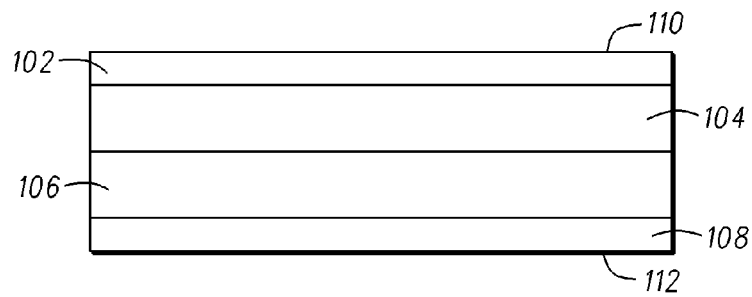
FIG. 1 is a partial cross section view of a first exemplary embodiment.

The following detailed description is merely exemplary in nature and is not intended to limit the invention or the application and uses of the invention. Furthermore, there is no intention to be bound by any theory presented in the preceding background or the following detailed description.

Housings are used to contain or store, and protect, a wide variety of items or devices and typically are a rigid or flexible material of a specific color. The term "housing" generally refers to a material at least partially covering or surrounding an item, and may assume other names such as a "case", for example. Items disposed within a housing range, for example, from keepsakes such as jewelry to electronic devices such as cell phones.

The housing described herein includes a transparent support layer, a photoreactive coating, a radiation attenuating material, an optional background color layer, an optional activating radiation source, and an optional patterning layer. The transparent support layer provides structure to the housing. The radiation attenuating material, transparent to visible light, absorbs radiation, such as ultraviolet (UV) from sunlight, and prevents the unintentional changing of the color of the photochromic coating and degradation of the other layers beneath. The radiation attenuating material may be referred to as a blocking material when the UV radiation is substantially prevented from passing there through. When a slow color or design change is preferred, such as developing of patina effect, the UV blocking ability or efficiency can be engineered to allow, or attenuate, a limited amount of UV to reach the photoreactive layer to slowly activate the process. The photoreactive coating may be photochromic ink of a solution of a 1,2-dihydroquinoline (DHQ) in a polymer solution that irreversibly changes color when exposed to activating radiation such as UV radiation. The photoreactive material may also be a photosensitive layer containing silver oxalate and mercury(I) and/or mercury(II) oxalate. Another example is pyrrole derivatives, such as 2-phenyl-di(2-pyrrole)methane, which becomes irreversibly red upon UV light exposure. The photoreactive coating may originally comprise a color or be clear, and is changed to a color, or from a color to clear, upon the application of radiation. As used herein when referring to the photoreactive coating, the word "color" includes a visible color or no visible color (clear). The optional background color layer provides an initial color to the housing, and may be a partially reflective layer of metallization. The background color may be provided alternatively by the transparent support layer or may be omitted altogether when a transparent housing is desired (for displaying objects within the housing). The radiation source may be for example, a light emitting diode (LED), which emits light at specific wavelengths, for example ultraviolet or fluorescent black light, that activate the color changing process of the photoreactive compounds. While UV radiation is preferred, other wavelengths may be used.

Referring to FIG. 1, housing 100 includes a transparent support layer 104 having a UV blocking coating 102 formed thereon. While the transparent support layer 104 may be any known transparent material, a polymer material is preferred. The transparent support layer 104 provides protection to items within the housing, and a surface on which to apply the UV blocking coating 102 and the photoreactive coating 106.

The UV blocking coating 102 is a material that contains compounds, such as Benzotriazole or Benzophenone, that absorbs UV radiation found in the ambient environment, for example, in the range of 280 to 400 that includes both UV-A and UV-B, and especially UV radiation within sunlight.

The photoreactive coating 106 is a material of dye molecules that initially assumes a first color, then irreversibly changes to a second color upon the application of activating radiation. The second color remains when the activating radiation is removed. This material is, for example, preferably a matrix of 1,2-dihydroquinoline (DHQ) in polymer (See U.S. Pat. No. 4,812,171) or other materials such as a photosensitive layer containing silver oxalate and mercury(I) and/or mercury(II) oxalates, pyrrole derivatives, such as 2-phenyl-di(2-pyrrole)methane.

A transparent colored layer 108 is disposed contiguous to the photochromic coating 106. The outer surface 110 of the UV blocking layer 102 is considered the outside of the housing while the inside surface 112 of the transparent colored layer 108 is the inside of the housing in which items (not shown) may be contained. Undesired UV radiation such as sunlight striking the surface 110 will not penetrate beyond the UV blocking coating 102 to the photochromic coating 106. However, a user of the device viewing the outer surface 110 will view the color presented by the colored layer 108 since the UV blocking coating 102, support layer 104, and photochromic coating 106 are transparent to frequencies in the visual range of approximately 400 to 780 nanometers. Note that the colored layer 108 is optional, in which case the housing 100 is transparent, enabling the contents of the housing 100 to be viewed.

Figure 2:
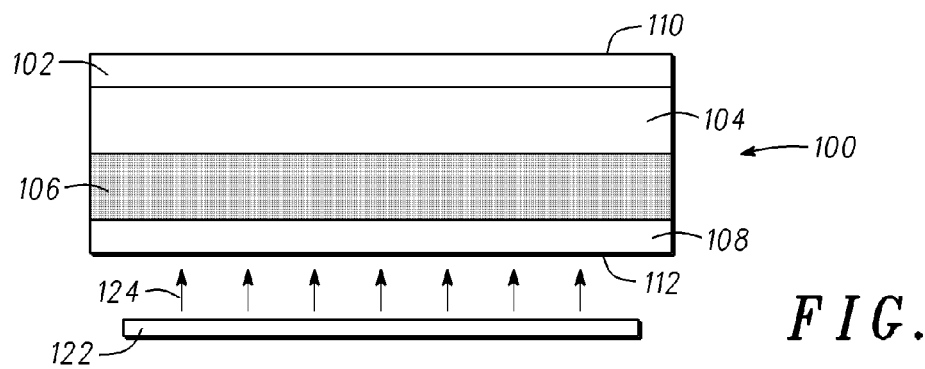
FIG. 2 is a partial cross section view of a first exemplary embodiment having activating radiation applied.

Referring to FIG. 2, a light source 122 such as a light emitting diode provides activating radiation 124 to the inside surface 112 of the housing 100. The activating radiation 124 passes through the transparent colored layer 108 and strikes the photochromic coating 106, causing it to irreversibly assume a color as indicated by the crosshatching within photochromic coating 106 of FIG. 2. The color in which the photochromic coating 106 changes depends on the chemicals contained therein and its thickness. Examples of chemicals for the irreversible photochromic coating 106 include 1,2-dihydroquinoline (DHQ) in a polymer solution, a photosensitive layer containing silver oxalate and mercury(I) and/or mercury(II) oxalates, pyrrole derivatives, such as 2-phenyl-di(2-pyrrole)methane. The thickness of the photochromic coating 106 preferably includes the range of 0.1 micron to 100 microns. The housing then exhibits the color, viewing towards the outside surface 100, combined from the colors of the colored layer 108 and the photochromic coating 106. For example, if the color of the colored layer 108 is blue and the color assumed by the photochromic coating 106 is yellow, a green color would be presented at the surface 110.

Figure 3:
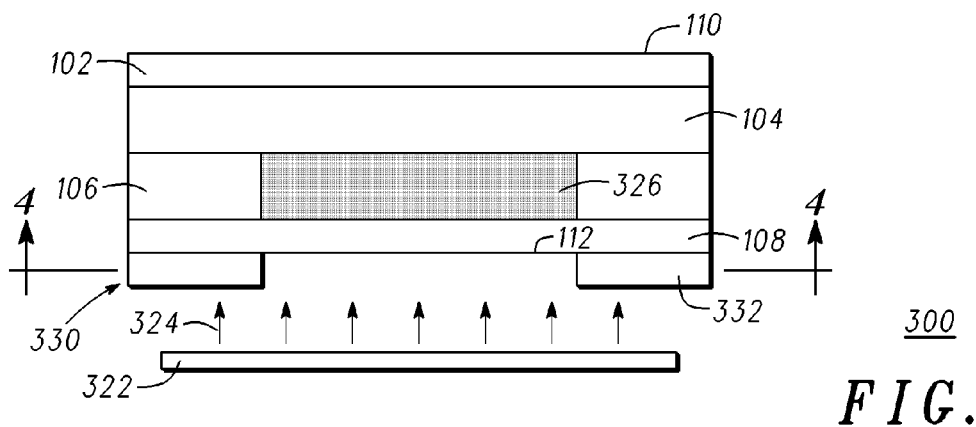
FIG. 3 is a partial cross section view of a second exemplary embodiment having activating radiation applied.

FIG. 3 shows a second exemplary embodiment of a housing 300 including the UV blocking coating 102, transparent support layer 104, photochromic coating 106, and transparent colored layer 108 as described for the housing 100. A UV blocking layer 330 is patterned on the transparent colored layer 108 resulting in a light source 322 such as a light emitting diode provides activating radiation 324 through the patterned material 332 to the inside surface 112 in the gaps between the material 332 of the patterned layer 330, causing the area 326 to change to a color (as indicated by the crosshatching).

Figure 4:
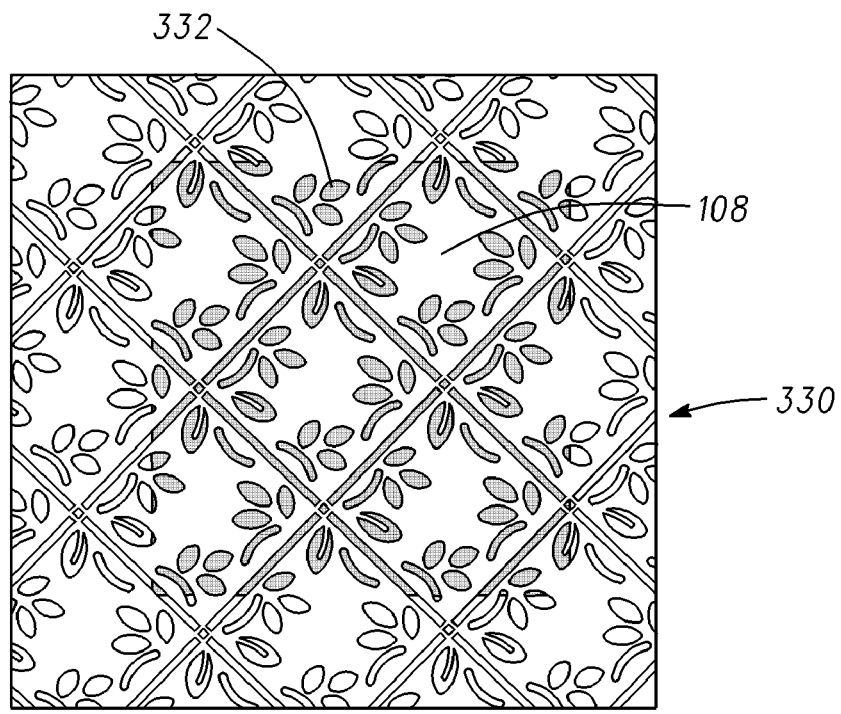
FIG. 4 is a view taken along line 4-4 of the exemplary embodiment of FIG. 3.
Figure 5:
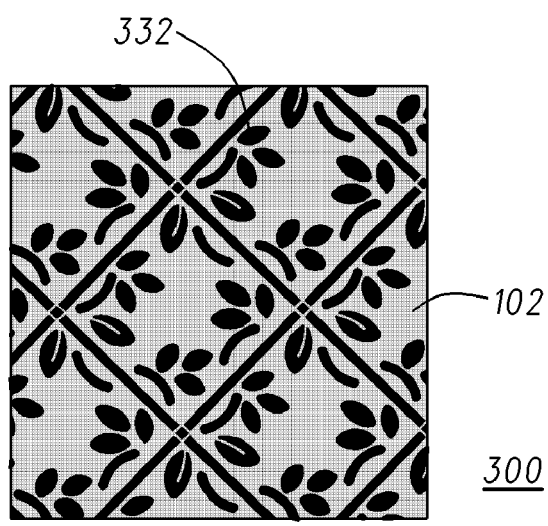
FIG. 5 is a view taken from the top of the exemplary embodiment of FIG. 3.

FIG. 4 is taken along line 4-4 of FIG. 3, showing the patterned material 332 of the patterned layer 330 forming a fanciful pattern formed on the colored layer 108. FIG. 5 is the result showing the color and pattern looking at the surface 110 of the UV blocking coating 102 of the housing 300 in which the patterned material is distinctly seen through the transparent layers 104 and 102.

Figure 6:
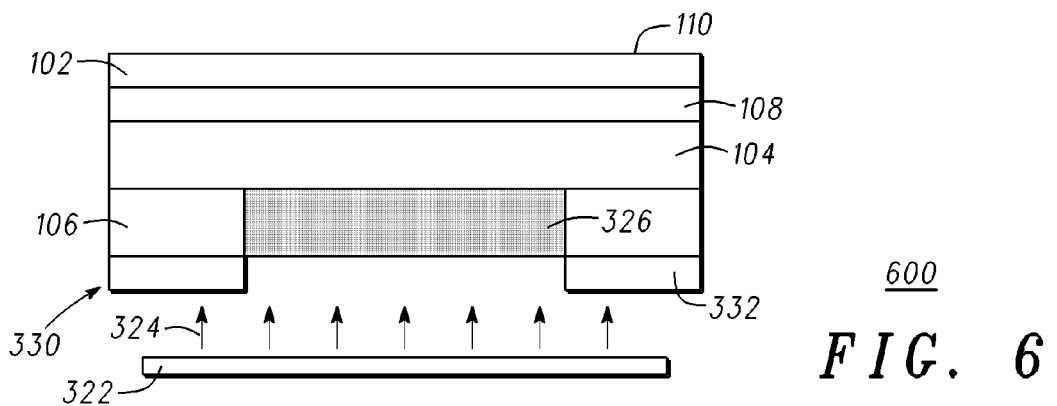
FIG. 6 is a partial cross section view of a third exemplary embodiment having activating radiation applied.

FIG. 6 is a third exemplary embodiment of a housing 600 similar to the second exemplary embodiment of FIG. 3; however, the colored layer 108 is disposed between the UV blocking coating 102 and the transparent support layer 104. Note in this third exemplary embodiment, the colored layer 108 need not be transparent to the activating radiation.

Instead of the light sources 122, 322, a fourth alternate exemplary embodiment includes a door, or sealable opening, that may be opened to allow sunlight to enter, striking the photochromic coatings 106, causing it to change colors and/or pattern.

Figure 7:
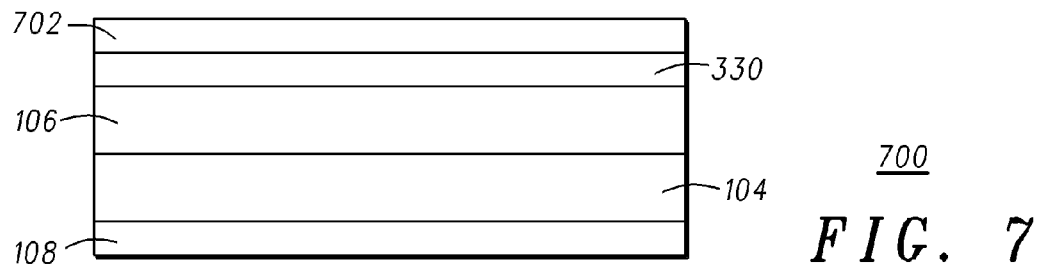
FIG. 7 is a partial cross section of a fifth exemplary embodiment.

Referring to FIG. 7, a fifth exemplary embodiment includes a housing 700 having a UV attenuating layer 702 formed over the photochromic coating 106, and the transparent support layer 104 disposed between the photochromic coating 106 and the colored layer 108. The UV attenuating layer only partially blocks UV radiation, for example from sunlight, resulting in the color of the photochromic coating 106 slowly changing color over time. Depending on the thickness and the chemical makeup of the attenuating layer and the photochromic coating 106, this change in color may take days to weeks or more. Additionally, the patterned layer 330 may be included to cause a change in pattern over time.

There are many variations to the above described embodiments. As mentioned, the colored layer 108 is optional (the housing may be transparent or the color may integrated within the transparent support layer 106) and may be disposed on either side of the support layer 104 or the photochromic coating 106. The photochromic coating 106 may be disposed on either side of the support layer 104 or may be integrated within the support layer 104. The disposition of the patterned layer 330 is also variable as long as it is disposed between the photochromic coating 106 and the source of radiation.

Figure 8:
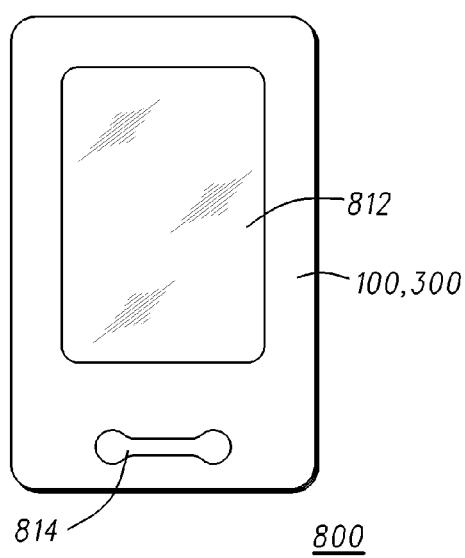
FIG. 8 is a top view of a device including the exemplary embodiment of FIG. 2.

Although the housing 100, 300 described herein may be used to house many types of devices, FIG. 8 shows in schematic form a mobile communication device, which may be used with the exemplary embodiments of the housing 100, 300 described herein, and includes a touchscreen display 812 formed within the housing 100, 300. Conventional mobile communication devices also include, for example, an antenna and other inputs which are omitted from the figure for simplicity. Circuitry (not shown) is coupled to each of the display 812, and typically a speaker and microphone (not shown). An icon 814 is disposed below the touchscreen display 812. It is also noted that the portable electronic device 800 may comprise a variety of form factors, for example, a "foldable" cell phone. While this embodiment is a portable mobile communication device, the present invention may be incorporated within any electronic device having a housing that incorporates an electro-optical module to change colors and/or patterns. Other portable applications include, for example, a laptop computer, personal digital assistant (PDA), digital camera, or a music playback device (e.g., MP3 player). Non-portable applications include, for example, car radios, stainless steel refrigerators, watches, and stereo systems. The low power requirements of the exemplary embodiments, specifically the light source providing UV radiation, presented herein make them particularly well suited to portable electronics devices.

Figure 9:
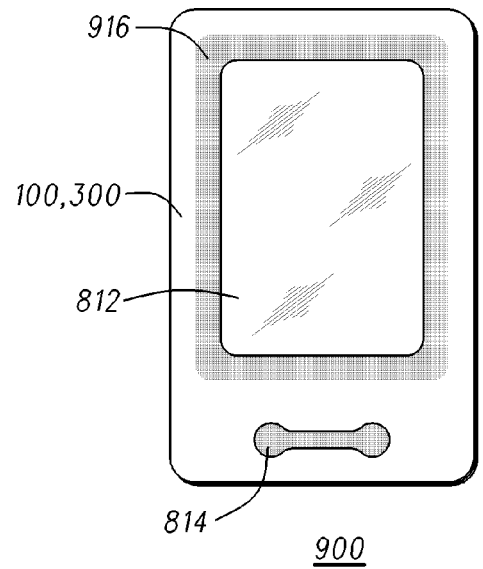
FIG. 9 is a top view of the device of FIG. 8 in accordance with a fifth exemplary embodiment.

A sixth embodiment includes disposing an LED so as to irradiate only of a portion of the housing 100, 300. For example, referring to the device 800 shown in FIG. 9, only the area 916 surrounding the touchscreen display 812 is irradiated (as shown by the cross hatching) by one light source 324.

Another light source 324 may selective irradiate the icon 814. Although only two light sources 322 are described with the exemplary embodiment of device 900, many more light sources 322 may be disposed within the housing 100, 300 to irradiate various portions of the device 900. Additionally, the photochromic coating 106 may be disposed in selective positions, such as behind only the icon 918, and then irradiated.

The exemplary embodiments described herein provides an easy, inexpensive way for users to irreversibly customize the appearance of a device's housing, while requiring little or no power requirements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A housing comprising:
   an ultraviolet radiation source selectively providing activating ultraviolet radiation wherein the ultraviolet radiation source includes a sealed opening in the housing that is selectively unsealed to allow sunlight to cause the change in color of the photoreactive material;
   a support layer transparent to light in the visual spectrum including a photoreactive material that selectively and irreversibly changes colors upon exposure to the activating ultraviolet radiation;
   an ultraviolet attenuation coating disposed over the support layer on a side opposed to the ultraviolet radiation source and configured to block ultraviolet radiation from the sun; and
   a layer of colored material disposed one of between the support layer and the ultraviolet radiation source or between the support layer and the ultraviolet attenuation coating.

2. The housing of claim 1 wherein the photoreactive material comprises a 1,2-dihydroquinoline and polymer matrix.

3. The housing of claim 1 wherein the activating radiation source comprises a light emitting diode.

4. The housing of claim 1 further comprising a patterned layer of an ultraviolet attenuation material disposed between the ultraviolet radiation source and the photoreactive material.

5. The housing of claim 1 wherein the ultraviolet attenuation coating absorbs substantially all ultraviolet radiation from sunlight and the housing further comprises:
   a plurality of activating radiation sources, each for affecting a change in color of an associated portion of the photoreactive material.

6. A method of changing the appearance of a housing including a support layer transparent to light in the visual spectrum, comprising:
   selectively applying activating radiation through a sealed opening in the housing that is selectively unsealed to provide the radiation to a photoreactive material disposed on a first side of the support layer or within the support layer transparent to light in the visual spectrum to irreversibly change the photoreactive material to a first color;
   blocking sunlight from the photoreactive material by a ultraviolet attenuation coating disposed over a second side of the support layer; and
   adding a second color to the first color by a layer of colored material disposed one of between the support layer and the ultraviolet radiation source or between the support layer and the ultraviolet attenuation coating.

7. The method of claim 6 wherein the housing further includes a patterned layer and the applying step comprises:
   selectively applying the activating radiation through the patterned layer to create a pattern within the photoreactive material.

8. The method of claim 6 wherein the applying step comprises applying activating radiation to a 1,2-dihydroquinoline/polymer matrix.

9. The method of claim 6 wherein the applying step comprises applying the activating radiation by a plurality of activating radiation sources, each to a distinct portion of the photoreactive coating.

* * * * *